MECHANICAL IMPLODER AND METHOD FOR GENERATING UNDER WATER SEISMIC SIGNALS

Filed July 25, 1966 2 Sheets-Sheet 1

Edward G. Schempf
INVENTOR.

BY Lee R Larkin

ATTORNEY

Edward G. Schempf
INVENTOR.

BY Lee R Laskin

ATTORNEY

United States Patent Office 3,369,627

Patented Feb. 20, 1968

1

3,369,627

MECHANICAL IMPLODER AND METHOD FOR GENERATING UNDER WATER SEISMIC SIGNALS

Edward G. Schempf, 1754 Utica Square, Tulsa County, Okla. 74114

Filed July 25, 1966, Ser. No. 567,504

5 Claims. (Cl. 181—.5)

ABSTRACT OF THE DISCLOSURE

A mechanical imploder and method for generating under water seismic signals. The apparatus includes a pair of opposed plates, a supporting assembly for submerging the plates under water, and a quick acting piston assembly for driving the plates apart rapidly to create a cavitation or vacuum into which water rushes causing an implosion producing the desired seismic energy signals. The method contemplates passing two opposed plate along a predetermined path under water and over the formation to be explored and generating seismic signals by driving the plates apart at predetermined intervals at a sufficient rate of speed to cause the aforesaid cavitation and generation of seismic signals, which signals are thereafter sensed or monitored.

This invention relates to an apparatus for producing under water acoustic signals. More particularly, this invention relates to an apparatus for producing under water acoustic signals which are used to generate seismic signals for testing sub-surface structures underlying a body of water.

The exploration of sub-surface structures lying below bodies of water is generally referred to as marine geophysical exploration. In this type of operation it is desirable to generate a seismic source signal, as for example an acoustical signal, in a body of water which signal travels downwardly through the water and into the sub-surface formations therebelow. Each interface of the sub-surface structure reflects back seismic signals which are then detected in transducers likewise supported under water in the form of hydrophones or the like. In order to carry out this type of marine geophysical exploration, it is desirable that it be accomplished from a moving boat which is adapted to traverse a predetermined course so that the exploration can be carried out continuously and uniformly over the entire area. Not only it is desirable to have the exploration conducted continuously, but it is also desirable that the procedure be safe as well as inexpensive. Further, it is desirable to produce sound waves in the desired frequency range to thereby produce optimum seismic signals.

Prior art methods and apparatuses which have been used for generating such sound sources include explosive charges, exploding gas, electrodes which produce electrical arcs and others. Each of these have shortcomings over which the present invention constitutes an improvement. Not only are explosive charges dangerous to operate but they are relatively expensive and require special handling.

Exploding gases are also difficult to handle, require special equipment as well as special handling procedures and are generally not as satisfactory as the present invention. The electrodes, which are sometimes used, are expensive and difficult to operate and require frequent replacement.

It is therefore, an object of this invention to provide an improved source for acoustical signals which may be used in seismic marine geophysical exploration, which is safe, simple of operation, inexpensive, and generally overcomes the shortcomings of the prior art noted above.

Briefly stated, the apparatus of this invention, which is

2 adapted to produce under water acoustic signals, includes a pair of opposed plates which are adapted for submerging in the body of water overlying the formation which is to be explored. Means are provided for driving the plates apart at predetermined intervals with sufficient force to create a temporary partial vacuum therebetween, thereby causing a sudden in-rushing of water resulting in an implosion producing an acoustical signal. In certain of the inventions, one of the plates may be provided with a flange about the edge thereof, which flange extends around the outer edge of the other plate when the two plates are held together.

Reference to the drawings will further explain the invention wherein like numerals refer to like parts and in which.

Figures 1, 2:
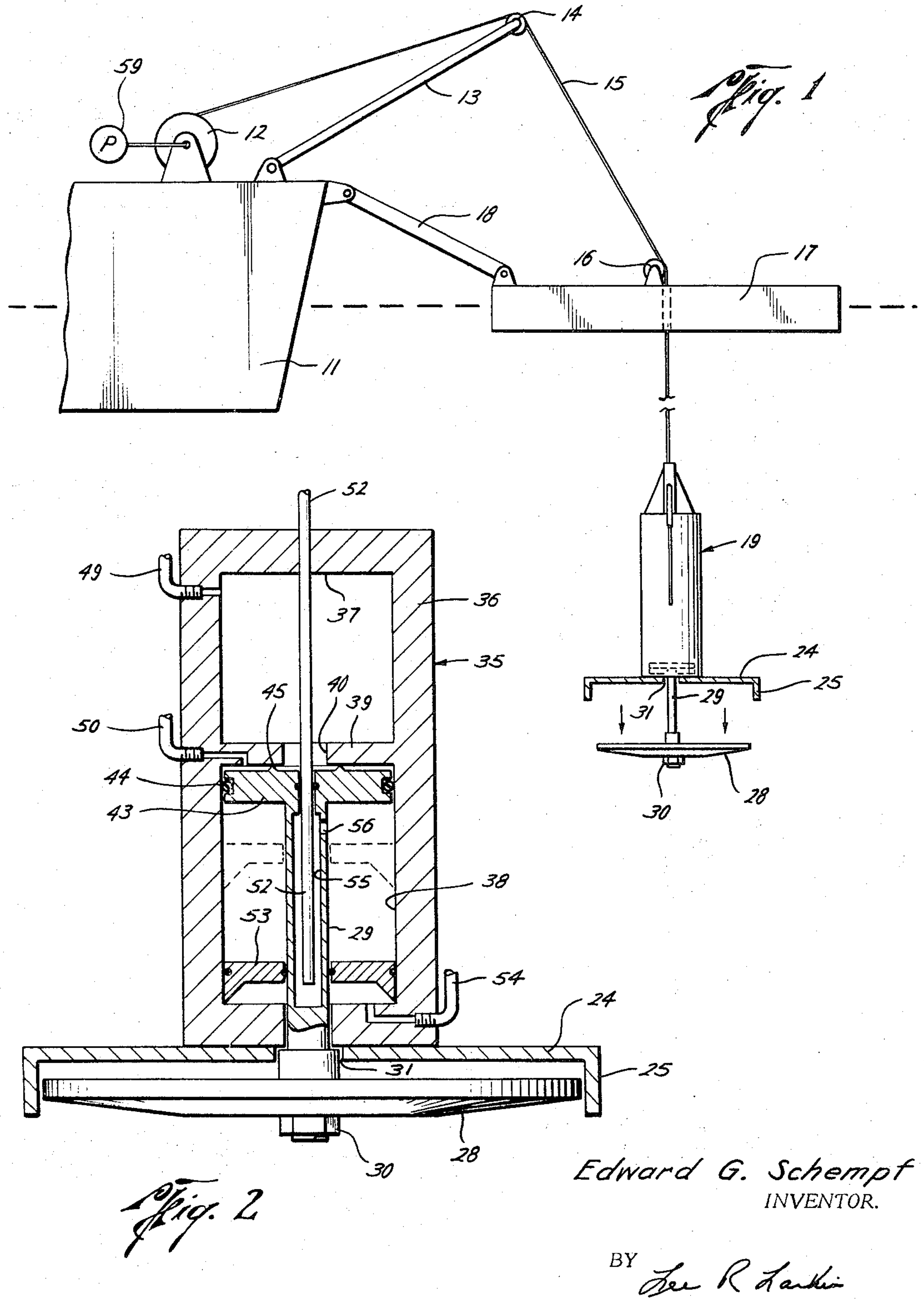
FIG. 1 is a diagrammatic side elevation view, partially in section, showing one embodiment of the present invention with the plates thereof in the open or separated position.
FIG. 2 is an enlarged cross-sectional view of the sound source device shown in FIG. 1, in the closed position.

Referring now to FIGURE 1, boat 11 is provided with a cable reel 12 mounted thereon and a mast 13 having a sheave 14 over which a composite pay-out cable 15 passes from reel 12, and over guide sheave 16 and down through float 17. Float 17 is connected to the stern end of boat 11 by connector 18 having pivoted connections at each end thereof.

Float 17 is adapted to float upon the body of water in which the exploration is being conducted and to thereby maintain the sound source which is hereinafter described at a uniform depth in the body of water.

Cable 15 connects at its lower end to actuator housing 19 which has attached to the lower end thereof an upper member having a flat downwardly facing surface in the form of upper plate 24 which is generally annular in shape and has an annular depending flange 25 connected about the periphery thereof.

Mounted below plate 24 and generally opposed thereto is another member in the form of lower plate 28 which is generally annular in shape and presents an upwardly facing surface which is generally coextensive or coplanar with the downwardly facing surface of plate 25 and generally conforms to the contour thereof. Lower plate 28 is mounted on the lower end of piston rod 29 by means of nut 30. Piston rod 29 passes upwardly through an annular central aperture 31 provided in plate 24 and is best seen in FIGURE 2.

Flange 25 is supported about the periphery of plate 28 in rather close fitting relationship when plate 28 is closed with plate 24. Plates 24 and 28 are supported generally parallel to each other and extend generally normal to horizontal in certain embodiments.

Means are provided for driving plates 28 and 24 apart at predetermined intervals with sufficient force to create a partial or temporary vacuum therebetween, thereby causing a sudden in-rushing of water resulting in an implosion producing an acoustical signal. Means are also provided for driving the plates together after each implosion to thereby displace water from therebetween in preparation for the succeeding implosion. These means can take many different forms and are conveniently referred to as the actuator in the description herein.

Referring now to FIGURE 2, one type of actuator is shown as actuator 35 which is provided with a vertically extending cylinder 36 having upper high pressure air chamber 37 and a lower low pressure air chamber 38 divided by an annular web 39 having an axial annular opening 40 therethrough and communicating between chamber 37 and chamber 38. The lower end of cylinder 36 is connected to upper plate 24, and piston rod 29 extends upwardly through an axial opening in the bottom of cylinder 36 and connects at its upper end to an annular piston 43 having an annular O-ring seal 44 thereabout and an annular reduced diameter seal ring 45 attached to the upper side thereof which fits in sealing relationship about opening 40 in web 39, the purpose of which will be explained hereinafter. High pressured chamber 37 may be supplied with a source of high pressure air via air line 49. In addition, an other air line 50 is connected to supply pressurized air to the annular space outside of seal ring 45 and between the lower surface of web 39 and the upper surface of piston 43, at predetermined intervals.

Piston rod 29 also has supported thereabout in generally sealed and sliding relationship therewith recock piston 53 which is adapted for vertical movement in air chamber 38. Air pressure is also adapted to be supplied to the annular space above recock piston 53 and the lower surface of piston 43 via tube 52 which extends down through chamber 36, through opening 40, into axial bore 55 provided in the upper end of piston rod 29, and out radial opening 56 in the side of piston rod 29. Hydraulic fluid is supplied to the lower side of recock piston 53 via recock fluid line 54.

In operation plates 28 and 24 will be supported generally in the opposed position shown in FIGURE 2 and submerged below the water surface. In the position shown in FIGURE 2, the water is substantially removed between the lower surface of upper plate 24 and the upper surface of plate 28. Air pressure on the order of 2,000 pounds per square inch is supplied to air chamber 37, and is thus applied to the top end of piston 43 in the area inside of seal ring 45. Lower pressure air is applied to chamber 38 via tube 52 and out opening 56. Hence, the entire under surface or lower surface of piston 43 is acted upon by the lower pressure present in chamber 38. The lower pressure of chamber 38 is selected such that its action on the lower surface of piston 43 balances the higher pressure of chamber 37, since the pressure therein is applied only to the smaller area on the upper surface of piston 43 within the seal ring 45.

When it is desired to actuate or to move the plates 28 and 24 apart, then a trigger pressure is applied in the form of air pressure through air line 50, which leads to the annular chamber outside of seal ring 45. The air pressure thus applied is sufficient to overcome the balance of pressure between chamber 37 and chamber 38 to thereby move piston 43 downward slightly to thereby break the contact or seal estabished by seal ring 45, at which point the pressure in chamber 37 is applied to the entire upper surface of piston 43, thereby forcing piston 43 downwardly with great acceleration.

The acceleration of piston 43 downwardly carries with it piston rod 29 and hence lower plate 28. The downward speed of piston 43 should be on the order of 800 feet per second in order to get the desired implosion, which occurs when plate 28 is moved downwardly relative to plate 24 such that a temporary partial vacuum is provided therebetween, causing a sudden in-rushing of water resulting in an implosion producing the desired acoustical signal. This signal is typified by having a predominance of components in the low frequency range, preferably on the the order of 60 cycles per second or less.

Means are also provided for re-cocking the actuator for the next cycle and to displace the water from between plates 28 and 24, again in contemplation of the succeeding implosion. These means, as noted above, include recock piston 53 which is moved upwardly by hydraulic fluid pressure applied via air line 54. Piston 53 carries with its piston 43 during the upward movement until the desired balance between chambers 37 and 38 is obtained and seal 45 contacts web 39. At this point pressure on line 54 is terminated and re-cock piston 53 is pushed downwardly by expansion of air in chamber 38. The frequency of the complete cycle for an implosion is approximately 7½ seconds.

Other actuator devices which may be used as the means for moving the plates relative to each other such as that shown in United States Letters Patent No. 2,979,938. It is to be understood that no claim is being made to the actuator per se, sepaarte and apart from the rest of the herein described apparatus.

It will be observed that flange 25 loosely fits about the periphery of lower plate 28 and thereby helps establish the desired vacuum as piston 28 moves downwardly relative thereto. The rate of movement of lower plate 28 relative to upper plate 24 to achieve the desired vacuum will of course be controlled by the diameter of the plates, the length of flange 25, the depth of submergence, and the like. With smaller diameters, the acceleration forces required to create the desired vacuum would of course be greater. Likewise, if the plates were operated without the use of flange 25, the rate of sepaartion required would be greater in order to obtain the desired vacuum.

The apparatus of this invention has the advantage that it may be operated by air which is a relatively cheap power source and which is easy to handle and requires a minimum of special equipment. The air and fluid lines which are used to operate the actuator can be supported or wrapped about pay-out cable 15 and air pressure supplied thereto via air pump 59 mounted on boat 11, or other air source. The signal produced by this invention is high in components in the desired frequency range as noted above. Moreover, the device does not require the use of expensive and dangerous explosives nor does it require the use of oxygen and propane as do gas devices.

The float 17 may be towed any desired distance behind boat 11 but preferably may be on the order of 40 to 50 feet. The depths at which plates 28 and 24 are submerged are preferably on the order of about 10 to 30 feet below the water surface. The apparatus of this invention may be mounted in different manners as will be shown by reference to the other drawings.

Figures 3, 4:
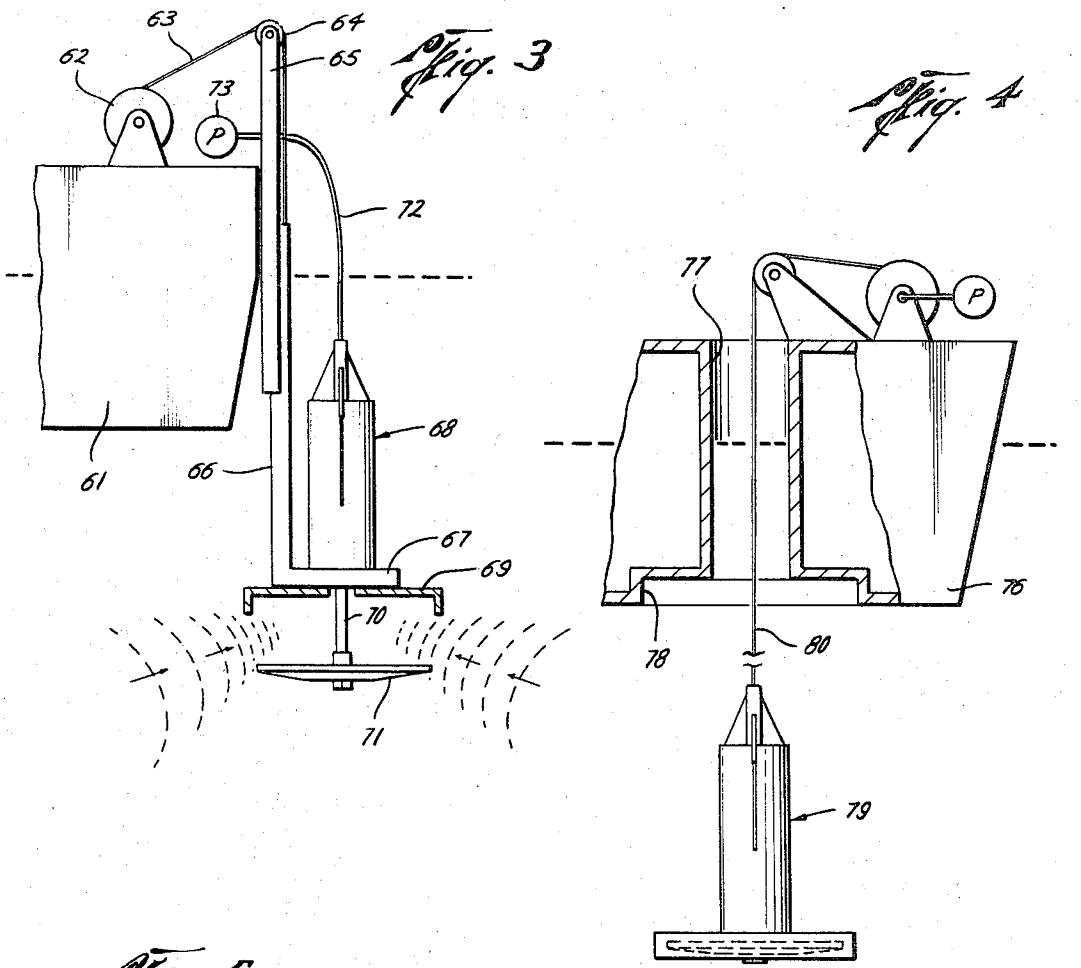
FIG. 3 is an alternate mounting for applicant's invention.
FIG. 4 is another alternate embodiment of the mounting for applicant's invention.

Referring now to FIGURE 3, boat 61 provided with reel 62 on the deck thereof which is adapted to pay-out support cable 63 over sheave 64 mounted on the top of vertical support 65 which supports L-shaped elevator 66 which has a horizontally extending platform 67 on the lower end thereof and on which is supported actuator housing 68 which corresponds with and is the same as actuator housing 19 shown in FIGURE 1. Platform 67 supports annular upper plate 69 which is similar to plate 24 in FIGURES 1 and 2. The actuator mounted in actuator housing 68 is connected to piston rod 70 which is similar to piston rod 29 in FIGURES 1 and 2, which in turn supports lower annular plate 71 which corresponds with plate 28 of FIGURES 1 and 2. The operation of plates 69 and 71 are the same as that shown in FIGURES 1 and 2. Air is supplied to the actuator mounted in actuator housing 78 via control line 72 connected to air pump 73 mounted on boat 61. In all other respects the operation of the device shown in FIG. 3 is the same as that shown in FIGS. 1 and 2. In other words, at predetermined intervals, lower plate 71 is driven downwardly with respect to upper plate 69 thereby creating a partial vacuum into which water rushes in the directions of the arrows shown, thereby creating an implosion which provides the desired acoustic signal. Plate 71 is thereafter drawn upwardly to plate 69 to depress the water from therebetween and in preparation for the next implosion.

FIGURE 4 shows another embodiment for supporting the device of this invention below the water surface, where boat 76 is provided with well 77 therethrough having an enlarged annular recess 78 at the lower side thereof. Actuator housing 79 is held and supported by composite cable 80 in well 77 during the under way condition and when the desired destination is reached where the exploration is to be conducted, then housing 79 can be lowered to the position shown and the seismic operation conducted in the same manner as shown in FIGURE 1.

Figure 5:
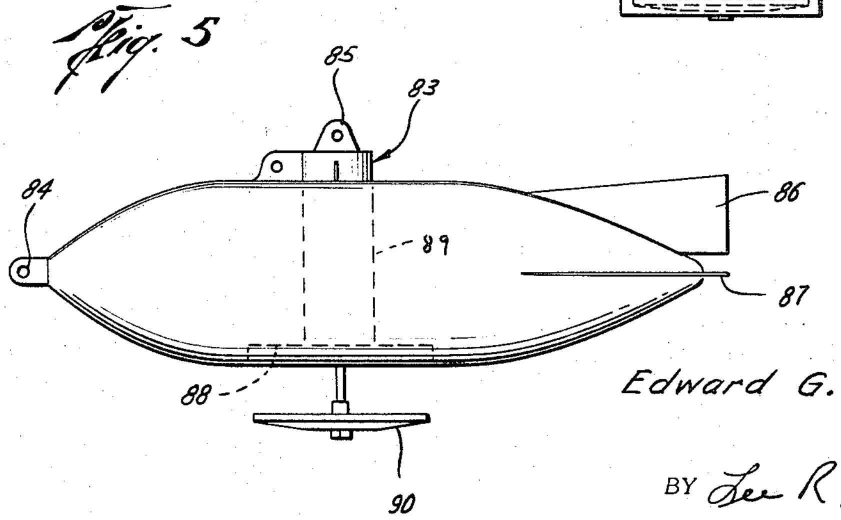
FIG. 5 is similarly another alternate mounting means for applicant's invention.

FIGURE 5 shows a submarine 83 which may be towed behind a boat the desired distance by tow lines attached to tow rings 84 and 85. The submarine is provided with fins 86 and 87 at the rearward end thereof to control the depth of running of the submarine 83.

The submarine is provided with actuator housing 89 which corresponds with actuator housing 19 of FIGURE 1, and is provided with an upper plate 88 which, in this instance, is integral with submarine 83, with lower plate 90 positioned therebelow, the latter of which corresponds with plate 28 in FIGURES 1 and 2 and operates in the same manner.

It will thus be observed that this invention provides an apparatus which may be mounted in a number of different manners for use in marine geophysical exploration.

It is to be understood that while the opposed plates have been described as being held in the horizontal position, and while this is the preferred position, it is to be understood that they could be arranged to extend vertically and the piston rod which is used to actuate one of the plates could be designed to move in a horizontal direction. So long as both plates are submerged below the water level, the implosion will still occur when the plates are moved apart with the desired force.

While flange 25 shown in FIGURES 1 and 2 has been described as being attached to upper plate 24, and while this is the preferred structure, it is to be understood that the flange could be attached to the lower plate, i.e., plate 28, such that it would, in the closed position, surround the peripheral edge of the upper plate, in the closed position.

Modifications may be made in the invention as particularly described without departing from the scope of the invention. Accordingly, the foregoing description is to be construed as illustrative only and is not to be construed as a limitation upon the invention as defined in the following claims.

What is claimed is:

1. In apparatus for producing underwater seismic signals, the combination comprising:

means for forming a cavity within a body of water, said means comprising a pair of opposed plates arranged for cyclical movement between opposed adjacent and opposed spaced positions; and means for cycling said plates between said positions, when submerged in a body of water, at a rate of travel sufficient to sequentially cavitate said water and produce an implosion.

2. The invention as claimed in claim 1 wherein:

one of the plates of said pair of plates is provided with a flange along the edge thereof, which flange extends along the outer edge of said other plate in generally close fitting relationship.

3. The invention as claimed in claim 1 wherein:

said plates are generally annular in shape.

4. In a method for marine seismic exploration, the steps of:

submerging a pair of opposed plates in a body of water at a plurality of points along a predetermined, generally horizontal path overlying the formation to be explored;

selectively moving said submerged plates between opposed adjacent and opposed spaced positions at a rate of travel sufficient to sequentially cavitate said water and produce an implosion; and monitoring the implosion generated signals reflected from said formation.

5. The invention as claimed in claim 4 wherein:

water is admitted around substantially the entire perimeter of said plates to cause said implosion.

References Cited

UNITED STATES PATENTS

| | | | |
|---|---|---|---|
| 955,359 | 4/1910 | Schell | 116—27 |
| 1,507,956 | 9/1924 | Du Bois-Reymond | 181—.5 |
| 1,520,291 | 12/1924 | Hahnemann | 181—.5 |
| 2,167,536 | 7/1939 | Suits | 181—.5 |
| 2,376,221 | 5/1945 | Baker | 259—1 |
| 2,877,859 | 3/1959 | Knudsen | 181—.5 |
| 2,895,062 | 7/1959 | Abbott | 181—.5 |
| 3,077,944 | 2/1963 | Padberg | 181—.5 |
| 3,100,022 | 8/1963 | Clark | 181—.5 |
| 3,209,834 | 10/1965 | Essary | 166—177 |
| 3,246,286 | 4/1966 | Barry | 340—7 |
| 3,255,820 | 6/1966 | Brandon | 166—177 X |
| 3,283,294 | 11/1966 | Schiom | 181—.5 |
| 3,289,784 | 12/1966 | Cassand et al. | 181—.5 |

FOREIGN PATENTS

| | | |
|---|---|---|
| 608,169 | 11/1960 | Canada. |

BENJAMIN A. BORCHELT, *Primary Examiner.*

SAMUEL W. ENGLE, *Examiner.*

W. KUJAWA, *Assistant Examiner.*